Feb. 8, 1955

G. MEDIANO CAPDEVILA 2,701,389

AUTOMATIC MACHINE FOR VULCANIZING
THE SOLE TO THE SHOE LENGTH

Filed Jan. 23, 1950

INVENTOR.
G. Mediano Capdevila
BY
Wenderoth, Lind & Ponack
Attorneys

Feb. 8, 1955 G. MEDIANO CAPDEVILA 2,701,389
AUTOMATIC MACHINE FOR VULCANIZING
THE SOLE TO THE SHOE LENGTH
Filed Jan. 23, 1950 5 Sheets-Sheet 2

INVENTOR.
G. Mediano Capdevila
BY
Wenderoth, Lind & Ponack
Attorneys

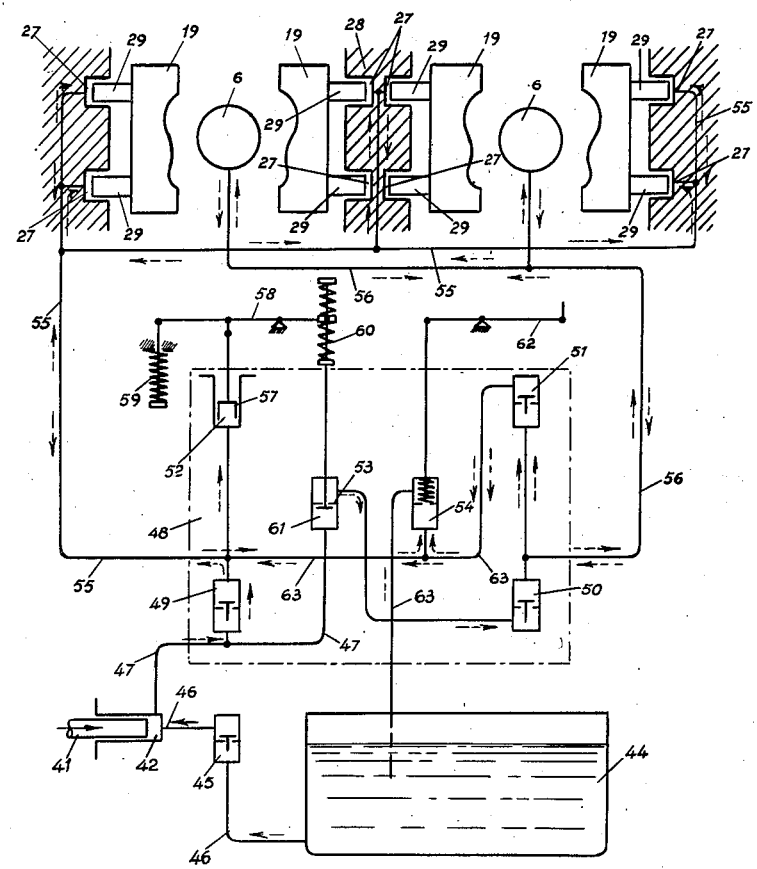

United States Patent Office 2,701,389
Patented Feb. 8, 1955

2,701,389

AUTOMATIC MACHINE FOR VULCANIZING THE SOLE TO THE SHOE LENGTH

Gonzalo Mediano Capdevila, Barcelona, Spain, assignor to Coturno, S. A., Caracas, Venezuela, a corporation of Venezuela Application January 23, 1950, Serial No. 140,070

Claims priority, application Spain February 11, 1949

5 Claims. (Cl. 18—17)

The present invention refers to an automatic machine for vulcanizing the sole to the shoe length, provided with lateral and vertical compression members, and worked automatically by liquid under pressure.

Its essential characteristic is complete automatism of all its movements, in respect of both preparation and working, with the particularity that said movements are automatically controlled, in accordance with a working plan previously laid down, by an automatic distributing device which, once the machine is started up, carries out all the operations of the various phases of the vulcanizing process, until a working cycle is completed, when the pressure is discharged and consequently the machine opens and permits replacement of the last carrying the finished shoe by another duly prepared with the further shoe length for manufacturing.

The automatic distributor is fed by a motor pump group, if the machine is built in unit form, or by a compressed liquid accumulator, provided with the corresponding charging pump and reserve tank, if several machines work as a battery when a high output is required.

In any case, apart from the manner in which the compressed liquid is fed and parallel with the automatic distributor, each machine, or preferably each group of two, is controlled by an electric circuit, provided with the corresponding apparatus to regulate the temperature, pressure, time and any other factors which have to be controlled during a vulcanization cycle, for which purpose the stoppage and opening of the machine is effected automatically, it being possible to carry out this operation at any time by hand, at the discretion of the operator attending the machine.

To facilitate explanation, drawings accompany this specification, a proposed execution being shown in these drawings, solely as an example.

In the drawings:

Fig. 6 is a diagram of the various relations between the parts comprising the pressure liquid operating device.

Figure 1:
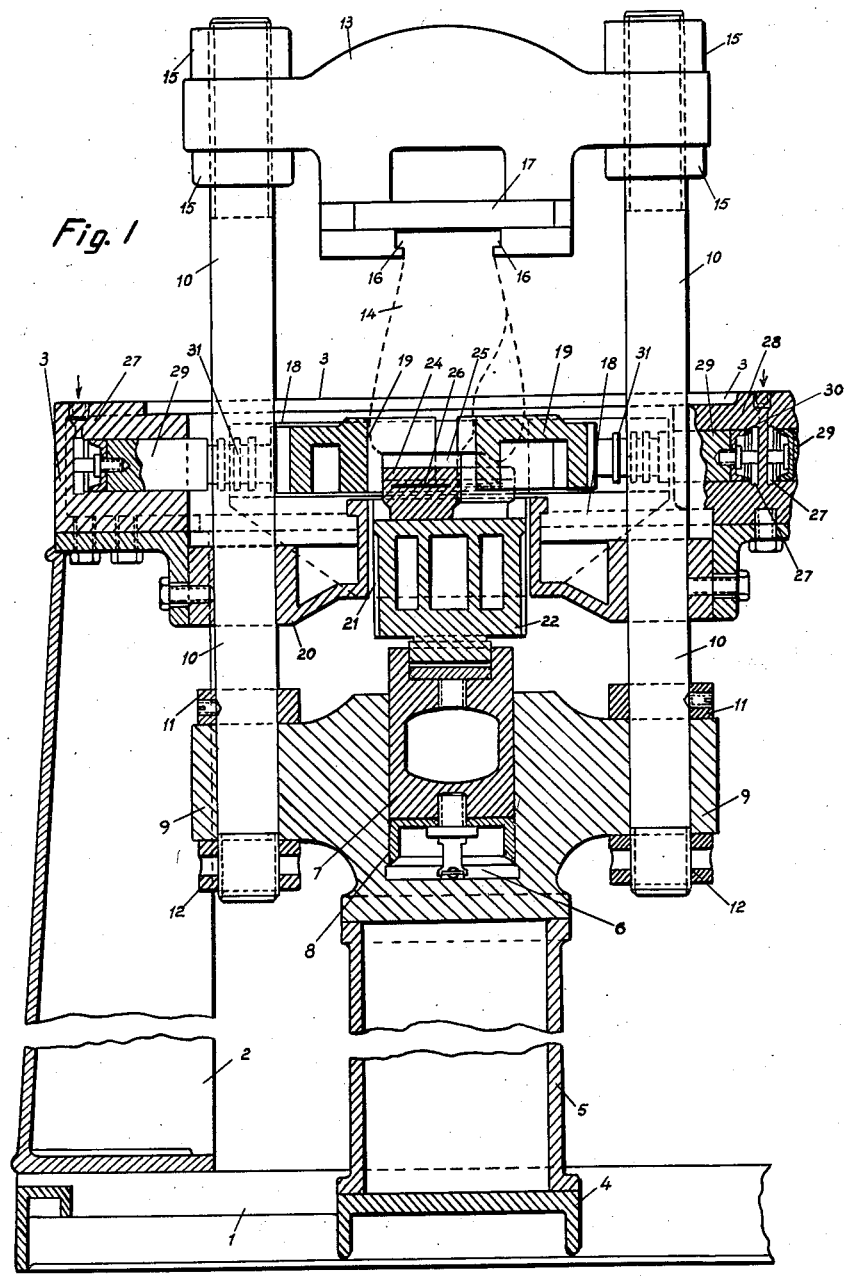
Fig. 1 is an elevation, in longitudinal cross section, showing one of the two machine groups.
Figure 2:
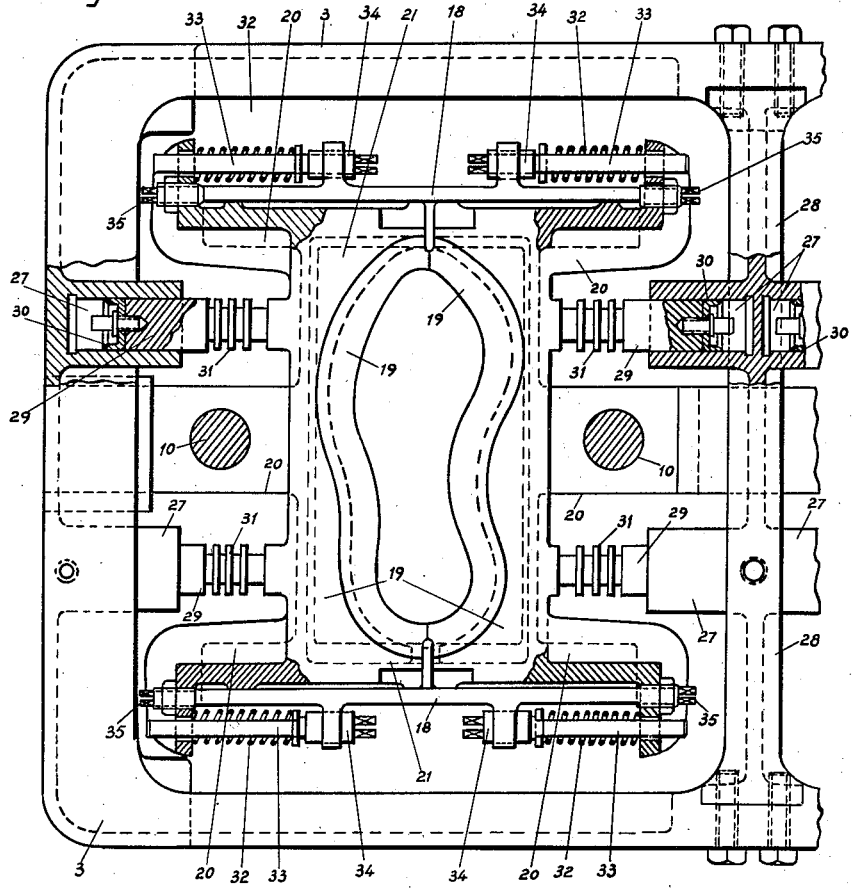
Fig. 2 is a plan, showing cross section through the working plane, of the group depicted in Fig. 1.

The invention consists in the use of a machine comprising a pedestal 1 (Figs. 1 and 2) on which rest columns 2 sustaining the working frame or platform 3 which consists of a variable number of machine parts, described below.

Pedestal 1 is provided with cross-bars 4 on which rest the parts driving the machine and hollow columns 5 each of which supports a motor cylinder 6, in which works a plunger 7 provided with appropriate packing 8, said cylinder being formed by a block constituting two lateral projections 9 to which are fixed vertical stays 10 by means of rings 11 and lock nuts 12.

The vertical stays 10 pass through a working platform 3, emerging to form a bridge with a cross bar 13 to which they are fixed by nuts 15. Said bridge carries the last 14 fixed in grooves 16 by a closure 17.

The working platform or frame 3 is composed of various parts destined to facilitate its construction, connected together by screws or other appropriate means, in such a manner as to form a double frame, with the particularity that they bear on the inside face of front and back guides 18 (Fig. 2) on which rest two pairs of jaws 19 constituting the lateral walls of the sole moulding box, once they are pressed against each other.

Figure 3:
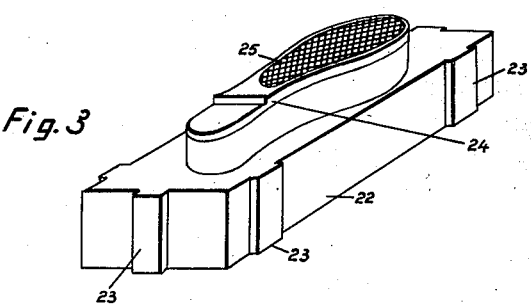
Fig. 3 represents, in perspective, the details of a rammer with the pattern of the sole.

The bottom of said platform or frame 3 is formed of two plates 20 provided in their central portion with box-shaped recesses 21 each of which serves as guide for a rammer 22 (Fig. 3) which is thus guided in said recess by surfaces 23.

Rammer 22 rests on piston 7, to which it is firmly attached and therefore it participates in the vertical movement; it bears, fixed to its upper face by any easily adjustable means, pattern 24, forming the bottom of the moulding box, and it is provided, on its external surface, with the appropriate configuration or design for reproduction on the sole of the shoe, whilst its lateral surface adapts itself perfectly with the walls of the box formed by the two jaws 19 when they are closed. Inside said pattern there is an adequate recess to contain an electric resistance 26 or any other appropriate means of heating.

The movement of the jaws is effected by means of cylinders 27, two cylinders being assigned to each jaw (Figs. 1 and 2), the outsides of the cylinders being worked in the inside of the lateral faces of frame 3, whilst the insides are worked on a cross bar 28, fixed to said frame. The cylinders mentioned house corresponding plungers 29, provided with gasket 30 and cooling vanes 31 to deal with the heat transmitted by the jaws, which tend to separate owing to the action of springs 32, coiled on cores 33, provided with adjusting screws 34 to regulate the pressure of the springs.

Moreover, the above mentioned jaws have adjustable stops 35 resting on the heads of the guides 18.

Figure 4:
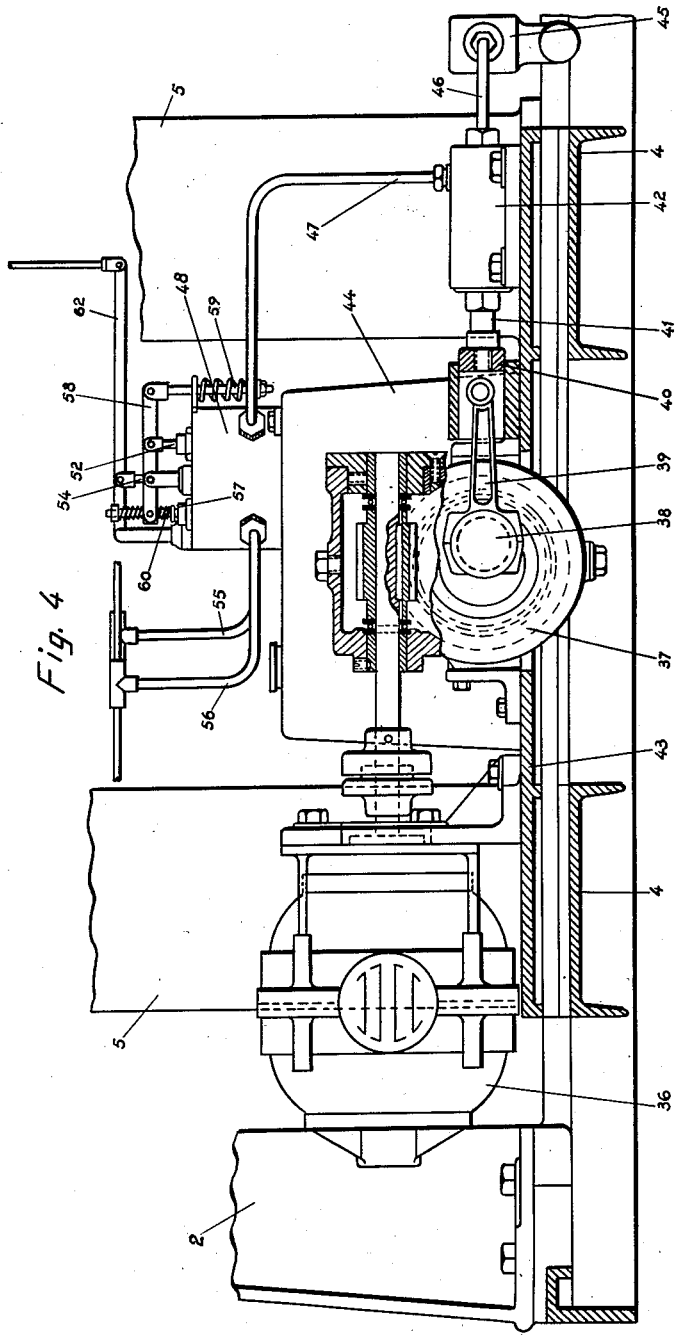
Fig. 4 is an elevation, with arbitrary cross sections, of the motor pump group and automatic operating device worked by liquid under pressure.
Figure 5:
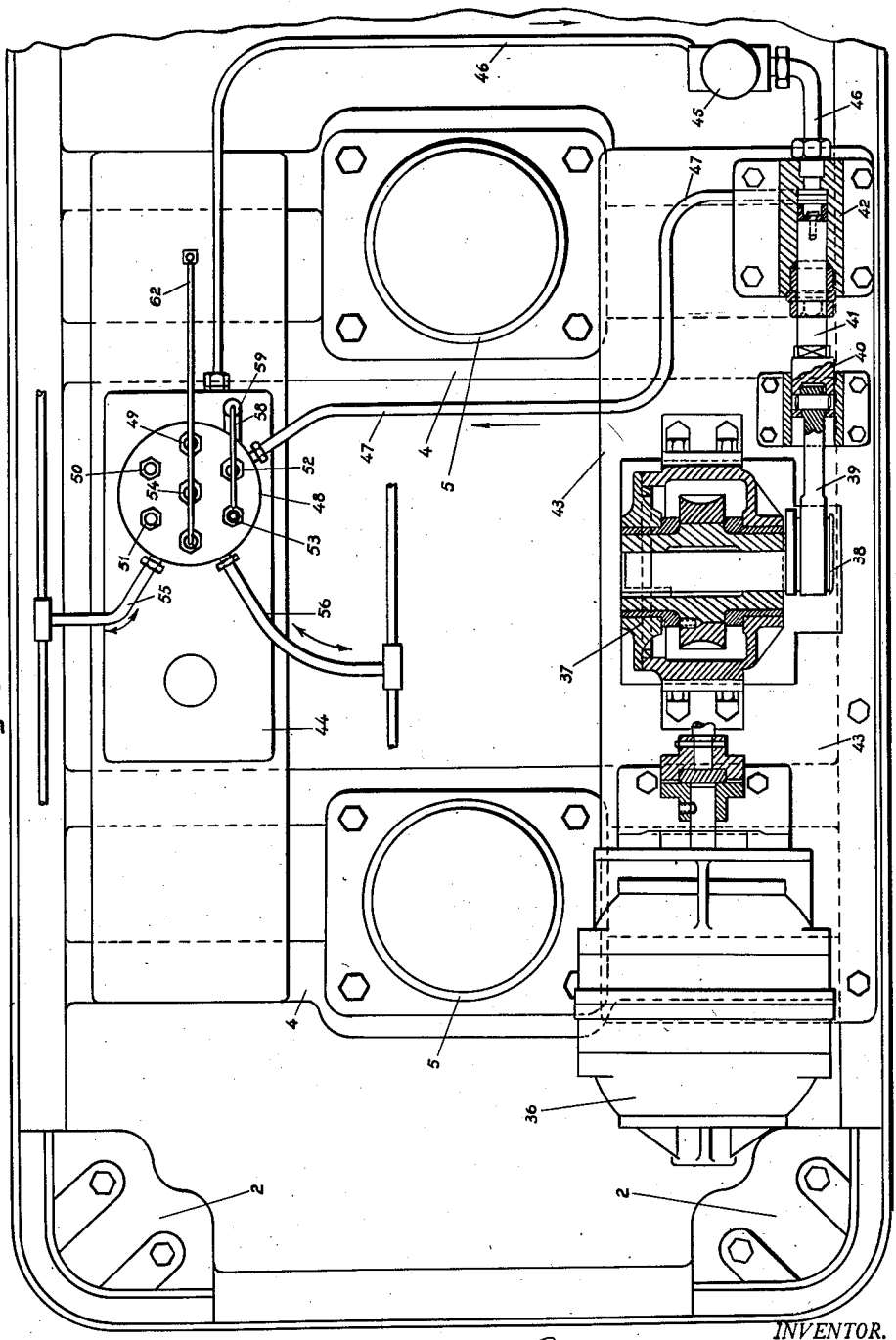
Fig. 5 shows a plan of the group seen in Fig. 4.

The action of these devices is effected by means of liquid under pressure, supplied by a motor pump group which, in the case of the individual machine, comprises (Figs. 4 and 5) motor 36, speed reducing gear box 37, crankshaft 38 and connecting rod 39, which actuates a cross head 40 of a plunger 41 of pump 42, all of this being assembled in a single pedestal 43, supported on the cross bars 4 of the machine base.

Said pump draws the liquid from a tank 44, through a non-return valve 45 and corresponding suction tube 46 and after its pressure has been raised delivers it through tube 47 to the automatic distributor 48 (Fig. 6) provided with non-return valves 49, 50, 51, automatic operating device 52, 53, and discharging valve 54, all the foregoing being accommodated in recesses made in a metal block and connected by the necessary communicating ducts.

From distributor 48 go two pressure tubes, 55 for feeding the lateral cylinders and 56 for the large cylinders or rammers, whilst discharge is effected directly to tank 44, to which is fitted the above mentioned distributor 48.

In the case of the variant on the basis of battery actuation, the individual motor pump group is eliminated, the series of machines being operated directly from a liquid accumulator, or other similar source of power, the mechanism being reduced to the automatic distributing apparatus.

In any case this automatic distributor is related to an electrical control circuit, comprising a time regulator to control the duration of the working cycle, combined with a contact manometer which keeps the pressure within fixed limits, or following a previously fixed programme of variations, also the relays or contactors necessary to effect connection and disconnection of the motive group of the discharging valve, members controlling the temperature and other regulating devices to ensure automatic working of the machine, though this automatism does not preclude the possibility of the operator's stopping the machine independently of the control devices.

The working is as follows:

Assuming the machine connected to the electric power supply system and with the heating resistances or other similar means 26 (Figs. 1 and 2) at the working temperature, last 14, prepared with the shoe length, is placed on bridge 13 and the sole or mass of crude rubber on pattern 25.

Immediately the motor 36 (Figs. 4, 5 and 6) is connected and the motor, through transmission gearing 37, 38, 39, will actuate the plunger 41 of pump 42, drawing liquid from tank 44, through the non-return valve 45 and tube 46, and driving it through the delivery tube 47 to the automatic distributor 48, in which there is retaining valve 49 which allows it to reach lateral cylinders 27 through tube 55, overcoming the pressure of springs 32 and pushing one jaw against the other, the moulding box being thus constituted owing to the fact that at the same time the upper edges of said jaws will press against the length and the last 14.

Up to now the pressure exerted by pump 42 has been moderate: it has only been sufficient to overcome the resistance of springs 32 but, as soon as the jaws have been pushed against each other, the pressure increases with each pulsation of the plunger, and as valve 53 is closed, the only path remaining free is that to the operating cylinder 52, in which the corresponding plunger will move, making lever 58 compress spring 59.

This movement produces compression on the upper end of spring 60 which exerts pressure on valve rod 53, this valve meanwhile remaining still as the pressure in chamber 61 is higher than the tension of said spring, but when, after a pulsation of pump 42 the pressure in tube 55 and cylinders 27 behind the non-return valve 49 is higher than that in tube 47, spring 60 will promptly open valve 53 owing to the fall in pressure in said chamber 61 below the value of the tension acquired by said spring, and from this moment the compressed liquid will pass through valves 53 and 50 to tube 56 and to cylinders 6 of the rammers, which will begin to rise, pressing the rubber against the shoe length, until the working pressure has been reached, and this pressure will keep constant or vary in accordance with a specific law, complying with the needs of the process, by means of the most suitable devices.

When the vulcanization period has expired, or at any suitable moment, the discharge valve 54 is operated, either by a solenoid connected to a clock or by manual operation of lever 62, provoking discharge of cylinders 27 and 6 through tubes 55 and 56, non-return valve 51, discharge valve 54 and discharge tube 63 to reserve tank 44.

The task of the non-return valve 51 is to prevent the pressure liquid from valve 49 from proceeding to cylinders 6 before jaws 19 are in position to permit discharge, in the opposite direction, of the above mentioned cylinders 6 and 27 and to compensate, once the appropriate pressure has been reached, for any possible leak in cylinders 27 which might cause jaws 19 to open, with the resulting loss of fluid rubber, which at this moment fills the moulding box.

In the event of this happening, the pressure in tube 55 would fall, valve 51 would permit the passage of a small quantity of the liquid contained in tube 56 until the pressure in both faces of said valve 51 was equalized, equivalent to saying the pressure in the lateral cylinders and rammers, thus re-establishing pressure equilibrium.

On discharge of the machine, jaws 19 are opened by the action of springs 32, whilst rammers 22 descend owing to their own weight and the action of springs, the machine being then open and in a position to permit replacement of the last with the manufactured shoe by another duly prepared with another length ready for the same operation.

The invention, consistent with its essential nature, can be embodied in other forms of execution different from those indicated as examples and the required protection will also cover the other forms of execution. The device can therefore be constructed in any manner and size, the most suitable materials being used in each case, for the whole of the foregoing is covered by the claims.

I claim:

1. An automatic sole vulcanizing machine comprising a frame, a bridge secured to said frame for receiving a last, lateral compression elements horizontally reciprocable in said frame, guide means on said frame for said lateral compression elements, a series of cylinders having plungers connected to said compression elements, a vertical reciprocating ram in said frame cooperating with said last, hydraulic fluid means for operating said plungers and said ram in predetermined sequence and spring means interposed between said guide means and said lateral compression elements biasing said elements to initial position against the action of said hydraulic fluid means to return said lateral compression elements to initial position upon release of said hydraulic fluid means.

2. An automatic vulcanizing machine as claimed in claim 1 and including a motor pump group connected into said hydraulic fluid means for actuating said plungers by fluid pressure.

3. An automatic vulcanizing machine as claimed in claim 2 and including a distributor for feeding said cylinders having said plungers therein and said vertical ram with fluid under pressure in predetermined sequence.

4. An automatic vulcanizing machine as claimed in claim 1 and including automatic control means for actuating said ram and said plungers in predetermined sequence, said control means comprising a cylinder and a valve connected by weighted levers at the end of a swinging lever, the rod of said valve being mounted in an elastic manner at the opposite end of the lever mentioned.

5. An automatic vulcanizing machine as claimed in claim 4, said cylinder comprising a motor cylinder supported on said frame, lateral projections on said motor cylinder, bridge support means connecting said lateral projections and said bridge, and a plunger in said motor cylinder secured to said ram for actuation thereof.

References Cited in the file of this patent

UNITED STATES PATENTS

| Number | Name | Date |
|---|---|---|
| 841,121 | Cavanagh | Jan. 15, 1907 |
| 896,224 | Mason | Aug. 18, 1908 |
| 1,994,278 | Halsall | Mar. 12, 1935 |
| 2,190,496 | Wagner | Feb. 13, 1940 |
| 2,221,742 | Hoza | Nov. 12, 1940 |
| 2,525,609 | Lewis | Oct. 10, 1950 |
| 2,553,999 | Banovsky | May 22, 1951 |